United States Patent
Baxter et al.

(10) Patent No.: US 7,265,332 B2
(45) Date of Patent: Sep. 4, 2007

(54) LIGHT MONITOR, ELECTRONIC CIRCUIT INCORPORATING A LIGHT MONITOR, AND METHOD OF MAKING THE SAME

(75) Inventors: Patrick Baxter, Edinburgh (GB); Jeffrey Raynor, Edinburgh (GB)

(73) Assignee: STMicroelectronics Ltd., Buckinghamshire (GB)

( * ) Notice: Subject to any disclaimer, the term of this patent is extended or adjusted under 35 U.S.C. 154(b) by 0 days.

(21) Appl. No.: 11/154,222

(22) Filed: Jun. 16, 2005

(65) Prior Publication Data
US 2006/0097136 A1 May 11, 2006

(30) Foreign Application Priority Data
Nov. 11, 2004 (EP) ................. 04256991

(51) Int. Cl.
*H03K 17/78* (2006.01)
(52) U.S. Cl. ............................. 250/214 DC
(58) Field of Classification Search ........... 250/214 A, 250/214 DC; 341/133, 164
See application file for complete search history.

(56) References Cited

U.S. PATENT DOCUMENTS

| | | | |
|---|---|---|---|
| 4,985,632 A | 1/1991 | Bianco et al. .............. 250/372 |
| 5,408,293 A * | 4/1995 | Sakamoto et al. .......... 396/159 |
| 5,585,623 A * | 12/1996 | Ohtomo et al. ......... 250/214 R |
| 6,011,985 A * | 1/2000 | Athan et al. ................. 600/322 |
| 6,117,643 A * | 9/2000 | Simpson et al. ............. 435/7.1 |
| 6,144,024 A * | 11/2000 | Rushing .............. 250/214 DC |
| 6,295,413 B1 * | 9/2001 | Ogasawara ................. 396/155 |

FOREIGN PATENT DOCUMENTS

| | | |
|---|---|---|
| WO | WO96/10165 | 4/1996 |
| WO | WO03/021939 | 3/2003 |

* cited by examiner

*Primary Examiner*—Thanh X. Luu
(74) *Attorney, Agent, or Firm*—Lisa K. Jorgenson; Allen, Dyer, Doppelt, Milbrath & Gilchrist, P.A.

(57) ABSTRACT

A light monitor includes a single semiconductor substrate. A light to frequency (LTF) converter is on the single semiconductor substrate, a threshold comparator is on the single semiconductor substrate and coupled to an output of the light to frequency converter, and a light intensity calculator is on the single semiconductor substrate and coupled to an output of the threshold comparator.

26 Claims, 7 Drawing Sheets

LIGHT MONITOR, ELECTRONIC CIRCUIT INCORPORATING A LIGHT MONITOR, AND METHOD OF MAKING THE SAME

FIELD OF THE INVENTION

The present invention relates to light monitors, and in particular, to a light monitor on a single chip.

BACKGROUND OF THE INVENTION

Recent years have seen rapid growth in the demand for inexpensive, lightweight and robust measuring and control devices. This demand has been manifested in the rapid developments in the field of miniaturized devices, such as lab-on-a-chip.

Display backlighting significantly contributes to the battery consumption of mobile devices, such as notebook computers, PDAs and mobile phones. Consequently, it is possible to considerably increase the useful lifetime of a battery by controlling the backlights so that they are dimmed in dark conditions and are only increased when there are high ambient light levels.

Beyond the above specific example, the provision of inexpensive, miniaturized light monitoring sensors and control systems (e.g., for car headlights, large building lighting networks, street lighting networks, etc.) will clearly provide significant economic and environmental benefits. Traditional light sensors typically produce an analog output signal. One of the main challenges encountered in previous attempts to provide integrated miniaturized light sensing and control systems has been the problem of combining analog signal processing circuitry with digital signal processing circuitry on the same chip.

Accordingly, prior art on-chip light sensors have typically possessed limited data processing capabilities. This has created particular problems since it means that such devices have limited, if any, ability to compensate for manufacturing variations between components.

For instance, the Microsemi LX1970 and 71 (http://www.microsemi.com/micnotes/1403.pdf) device is an 8-pin dumb-sensor that requires continual monitoring. Similarly, the TDK BCS series requires continual monitoring. The Texas Instruments TAOS (TSL230R/A/B, TSL235R, TSL245) devices possess a narrow dynamic range with no fine control on the limit and no matching or compensation for component errors.

Since the present invention relates to imaging sensors, and more particularly, to a light to frequency converter, it is useful at this point to briefly review the properties of CMOS image sensors and the operation of the light to frequency converter circuit.

A brief overview of CMOS image sensors will now be discussed. Recent advances in the design and fabrication of complementary metal oxide semiconductor (CMOS) chips have meant that CMOS imaging sensors are adopting a more dominant position in the low-cost imaging market.

One of the main advantages of CMOS imaging sensors is that they can be produced using standard fabrication procedures which are already widely used for producing CMOS chips for computer processors, memory chips, etc. Furthermore, the signal processing and control circuitry for a CMOS imaging sensor can be integrated directly onto the CMOS chip.

A light to frequency converter circuit will now be discussed. As an overview, a light to frequency (LTF) converter, as described in U.S. Pat. No. 5,850,195 discloses a CMOS imaging sensor with a large dynamic range. The LTF converter architecture possesses several advantages over traditional imaging sensors. These advantages primarily reside in the following features: integration capacitance tolerance, integration capacitance size, and frequency output. These features will be discussed in more detail below.

With respect to integration capacitance tolerance in a conventional light sensor, a photodiode's capacitance is defined by its well capacitance. However, this feature can be hard to control. Consequently, it is difficult to produce an array of photodiodes with matched sensitivity.

In contrast, an LTF converter employs a charge amplifier structure, which ensures that the effective capacitance of the LTF converter is determined by an integration capacitance provided by a feedback capacitor. Since capacitors can be manufactured with tighter controls over their capacitance (e.g., poly-poly or metal-metal capacitors), the variability in the capacitance of the individual LTF converters in an LTF converter array is less than that of a similar number of traditional light sensors.

With respect to integration capacitance size, increasing the size of a photodiode should in principle increase its ability to collect incident photons. As a result, this increases its sensitivity to incident light. Larger photodiodes also possess an increased parasitic capacitance. This has the effect of negating the ability of the photodiode to collect more photons, and thereby eliminates any sensitivity benefits of the increased photodiode size.

In contrast, the LTF converter employs a charge amplifier structure that isolates the capacitance of the LTF converter's photodiode from the rest of the LTF converter circuitry. This ensures that the effective capacitance of the LTF converter is determined by the capacitance of its feedback capacitor (as described above). Consequently, it is possible to use a large photodiode in an LTF converter while retaining a small overall circuit capacitance, and thereby producing a high sensitivity detector.

With respect to frequency output, on-chip signal processing with traditional analog light sensors is relatively sensitive to noise from the other on-chip circuitry. In contrast, the charge amplifier structure of an LTF converter is readily combined with a comparator to produce a digital signal whose frequency is proportional to the light on the LTF converter's photodiode.

The digital signal produced by an LTF converter is both robust and measurable over a large dynamic range (i.e., 140 dB of dynamic range is practical with the charge amplifier architecture). In addition, the LTF converter system is auto-exposing, insofar as no external control loop is required to ensure that an LTF converter's photodiode pixel does not saturate.

The operation of an LTF converter will now be described below with reference to FIGS. 1-5. The LTF converter comprises a control circuit 4, a photodiode 6 and a current to digital signal converter 8. The current to digital signal converter 8 uses a switched-capacitor charge metering technique to convert a photo-current from the photodiode 6 to a digital signal of a specific frequency. The current to digital signal converter 8 comprises a bias circuit 10 (which controls the maximum operating speed of the digital signal converter 8), an amplifier circuit 14, a switched feedback capacitor 16 in a charge sensing amplifier circuit (not shown), a comparator 18 and a monostable multivibrator circuit 19.

Referring to FIG. 2, the charge sensing amplifier circuit 20 effectively isolates the remaining circuitry of the current to digital signal converter (not shown) from the large capacitance of the photodiode 6 (<100 pF). The charge sensing amplifier 20 comprises an operational amplifier 22 configured in a closed loop configuration with its non-inverting input coupled to a reference voltage ($V_{rt}$) and its inverting input connected to the feedback capacitor 16. The reference voltage ($V_{rt}$) is set as low as possible to increase voltage swing while maintaining the depletion region of the PN junction of the LTF converter. The reference voltage ($V_{rt}$) is usually set to approximately 0.7V.

Since the operational amplifier 22 has a large input impedance, virtually no current flows through it. Consequently, the output of the operational amplifier 22 changes to ensure that the inverting and non-inverting inputs of the operational amplifier 22 remain at the same potential (i.e., $V_{rt}$) In the process, a current flows through the feedback capacitor 16 which has the same magnitude (but opposite sign) to the photo-current generated by the photodiode 6 ($I_{pd}$)

Equation (1) below shows the relationship between the output voltage ($V_{out1}$) from the charge sensing amplifier 20 and the photo-current generated by the photodiode 6.

$$V_{out1} = -I_{pd}\frac{T_{int}}{C_{fb}} \qquad (1)$$

From the above expression it can be seen that the output voltage ($V_{out1}$) from the charge sensing amplifier 20 is independent of the photodiode's 6 capacitance. Referring to FIG. 3, the output voltage ($V_{out1}$) from the charge sensing amplifier 20 is accumulated until it reaches a maximum value ($V_{outmax}$) at which point it is reset.

FIG. 4 shows a system for resetting an integrating amplifier (not shown) in the amplifier circuit 14. In this system, the output voltage from the amplifier circuit 14 ($V_{out2}$) is transmitted to the comparator 18. In the comparator 18, the output voltage ($V_{out2}$) is compared against a reference voltage ($V_{ref}$). If the output voltage ($V_{out2}$) exceeds the reference voltage ($V_{ref}$), the comparator 18 transmits a control signal (CTRL) to the monostable multivibrator circuit 19. In response to the control signal (CTRL), the monostable multivibrator circuit 19 emits a pulsed signal (RESET) to discharge the feedback capacitor 16.

Consequently, the frequency of the control signal (CTRL) is also proportional to the photodiode current $I_{pd}$ (assuming that the integrating amplifier in the amplifier circuit 14 settles completely during the period of the control signal (CTRL)). The control signal (CTRL) is also fed to a divide-by-two circuit 30 to form the overall output signal ($F_{out}$) from the LTF converter. By employing a divide by two circuit 30, a symmetrical output signal is produced, which is more reliably detected since it no longer includes short pulses.

Returning to equation (1), since the rate of change (slope) of the output voltage ($V_{out1}$) from the charge sensing amplifier is proportional to the intensity of the incident light, the frequency of the overall output signal ($F_{out}$) from the LTF converter is also proportional to the incident light intensity. This proportionality is more clearly expressed in equation (2) below.

$$F_{out} = \frac{I_{pd}}{2C_{fb}(V_{ref} - V_{rt})} \qquad (2)$$

It can be seen from equation (2) that although the overall output signal ($F_{out}$) from the LTF converter is proportional to the photocurrent ($I_{pd}$) from the photodiode, it is also dependent on the reference voltages ($V_{ref}$, $V_{rt}$) and the capacitance of the feedback capacitor $C_{fb}$. While it is possible to use bandgap reference voltages to accurately produce the above reference voltages, the capacitance of the feedback capacitor is less easily controlled since it is typically subjected to manufacturing variations.

SUMMARY OF THE INVENTION

According to a first aspect of the invention, a light monitor comprises an LTF converter, thresholding means and light intensity calculating means. The LTF converter is in communication with the light intensity calculating means, and the light intensity calculating means is in communication with the thresholding means. The light monitor is provided on a single chip.

The light intensity calculating means may comprise a counter and clocking signal generating means to provide a clocking signal for the counter. The clocking signal generating means may comprise a constant current source in communication with a charge sensing amplifier circuit comprising a first feedback capacitor.

The light monitor may comprise means for scaling a signal generated by the LTF converter in accordance with the clocking signal, and means for accumulating a resulting scaled signal in the counter to calculate a scaled measurement variable.

The light intensity calculating means may comprise a counter, reference signal generating means and a crystal oscillator whose output provides a clocking signal for the counter. The counter may comprise means for accumulating a reference signal generated by the reference signal generating means to calculate a reference variable.

The counter may further comprise gain adjustment calculating means to calculate a gain adjustment that includes the deviation between the reference variable and an expected value of same.

The counter may further comprise means for accumulating a signal from the LTF converter to calculate a measurement variable. The counter may also further comprise means of adjusting the measurement variable in accordance with the gain adjustment to calculate a scaled measurement variable.

The thresholding means may comprise at least one register adapted to contain a value of a first limit variable. The thresholding means may further comprise means of comparing a value of the scaled measurement variable from the light intensity calculating means with a value of the first limit variable.

Preferably, the thresholding means may comprise transmission means for transmitting to an external system an indicator of whether the value of the scaled measurement variable exceeds the value of the first limit variable. The transmitting means may comprise a single output pin.

Optionally, the thresholding means may comprise at least two registers adapted to contain a value of a first limit variable and a second limit variable. The thresholding means may further comprise means of comparing a value of the scaled measurement variable with a value of the first limit variable and the second limit variable.

The thresholding means may comprise transmission means for transmitting to an external system an indicator of whether the value of the scaled measurement variable exceeds the value of the first limit variable; is less than the value of the second limit variable; or is between the values of the first limit variable and the second limit variable.

The transmitting means may be in communication with the external system through a bi-directional interface. The bi-directional interface may be an I2C interface, an SPI interface or a CAN interface. The bi-directional interface may be a wireless interface such as a Zigbee interface.

The thresholding means may transmit the values of the first and second limit variables to the registers through the bi-directional interface.

According to a second aspect of the invention, a lighting control system comprises a light source, a light monitor according to the first aspect, and a control device. The light monitor may comprise means of communicating a first signal representing the intensity of ambient light to the control means. The control means may comprise means of transmitting a control signal to the light source in response to the received count signal. The light source may comprise means of altering its output in accordance with the received control signal.

According to a third aspect of the invention, a portable computing device back-light control system comprises the lighting control system according to the second aspect.

According to a fourth aspect of the invention, a mobile telecommunications device back-light control system comprises the lighting control system according to the second aspect.

According to a fifth aspect of the invention, a street lighting control system comprises the lighting control system according to the second aspect.

According to the sixth aspect of the invention, an automotive lighting control system comprises the lighting control system according to the second aspect. The automotive lighting system may comprise headlamps, and a dashboard illumination system.

The present invention thus combines an LTF converter with signal processing circuitry to provide a light monitor on a chip. The data from such light monitors could then be used in a control strategy as outlined above.

BRIEF DESCRIPTION OF THE DRAWINGS

An embodiment of the invention will now be described with reference to the accompanying drawings in which.

DETAILED DESCRIPTION OF THE PREFERRED EMBODIMENTS

For the sake of clarity and consistency, the thresholding means and the light intensity calculating means will be respectively referred to in the following description as a thresholding comparator and an LTF converter light intensity calculator. Similarly, in the following description of the first embodiment of the invention, the clocking signal generating means will be known as a signal generator.

Figure 1:
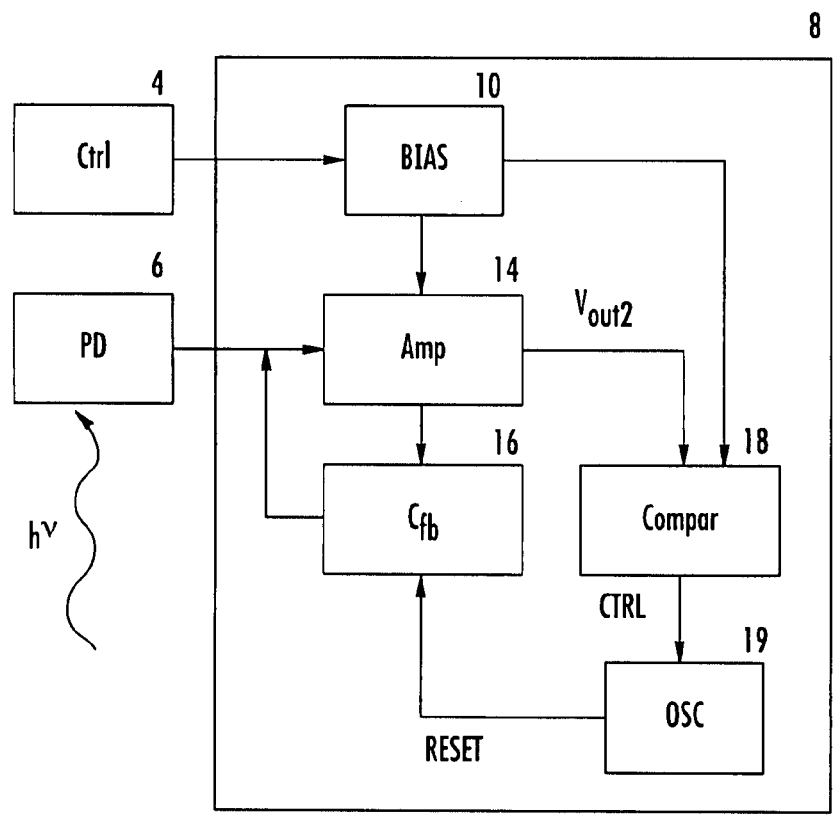
FIG. 1 is a block diagram of an LTF converter according to the prior art.
Figure 2:
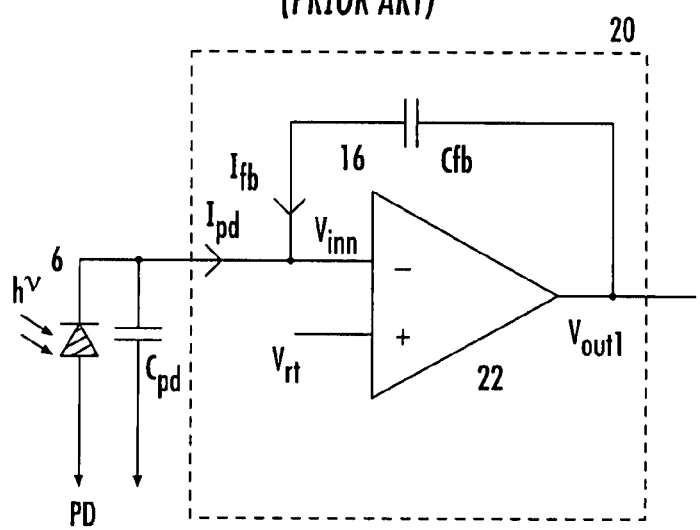
FIG. 2 is a simplified circuit diagram of a charge sensing amplifier used in the LTF converter shown in FIG. 1.
Figure 3:
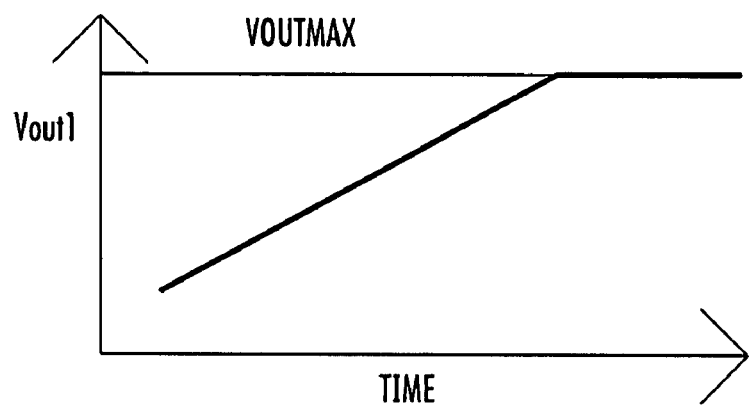
FIG. 3 is a graph of the output voltage from the charge sensing amplifier shown in FIG. 2, during a period of time in which the LTF converter shown in FIG. 1 is exposed to light.
Figure 4:
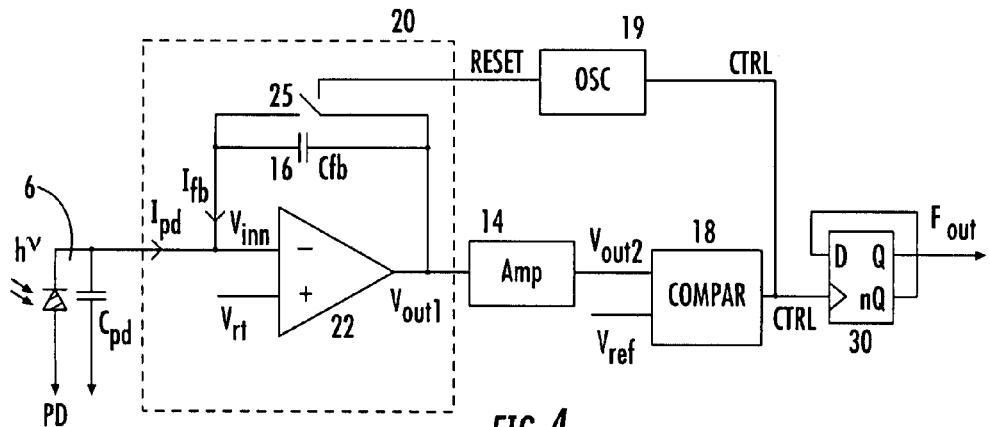
FIG. 4 is a detailed block diagram of the current to digital signal converter in the LTF converter shown in FIG. 1.
Figure 5:
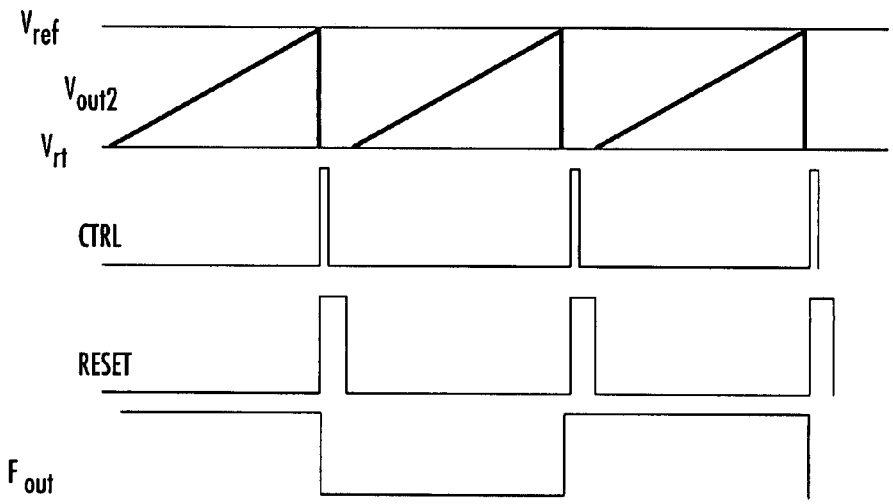
FIG. 5 is a timing diagram for the following signals in the LTF converter shown in FIG. 1: a reference voltage ($V_{ref}$), an output voltage ($V_{out2}$), a pulsed reset signal, and an overall output signal ($F_{out}$)
Figure 6:
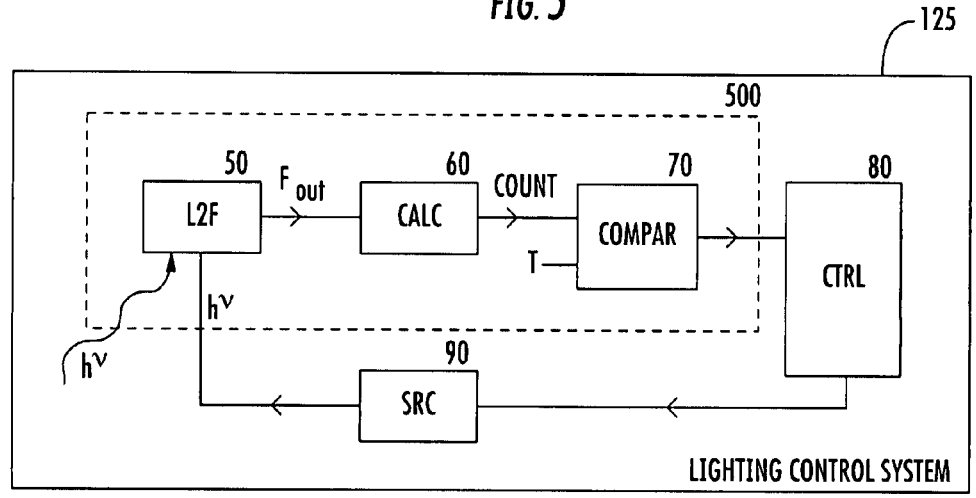
FIG. 6 is a block diagram of the light monitor of the present invention in use in a light control system.

Most control strategies are based upon the comparison of the value of a measured variable with a target value for that variable. Referring to FIG. 6, the light monitor 500 comprises an LTF converter 50, a LTF converter light intensity calculator 60 and a threshold comparator 70. The output signal from the light monitor may then be transmitted to a distributed control system or other suitable controller 80. In response to the data from the light monitor 500, the controller 80 adjusts the power to a light source 90.

Figure 7:
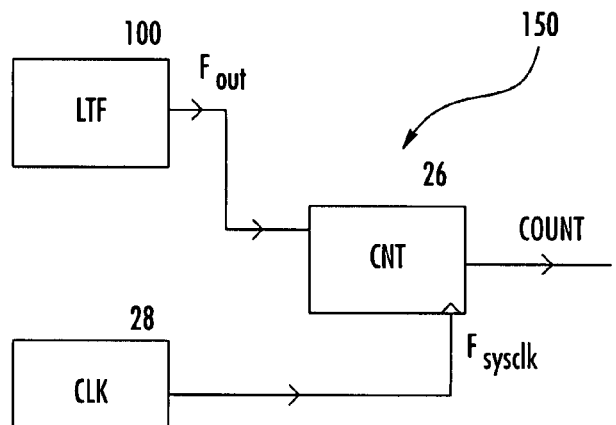
FIG. 7 is a block diagram showing an overview of a first embodiment of the LTF converter light intensity calculator component of the light monitor shown in FIG. 6.

A light intensity calculator 50 will initially be discussed. As a broad overview and in reference to FIG. 7, in a first embodiment of the LTF converter light intensity calculator 150, the digital output signal from an LTF converter 100 is fed into a counter 26 together with a reference signal of a fixed pre-defined frequency ($F_{sysclk}$). The reference signal is provided by a signal generator 28 and is used to provide a clocking mechanism for the counter 26. The counter increments a COUNT variable in accordance with the reference signal ($F_{sysclk}$) within the period of the pulse received from the LTF converter 100. Consequently, the value of the COUNT variable accumulated within the period of the pulse from the LTF converter 100 provides a quantized measurement of the intensity of the light detected by the LTF converter's photodiode.

The relationship between the COUNT variable and the frequency of the output signal from the LTF converter 100 is shown in equation (3) below.

$$\mathrm{COUNT} = \frac{F_{sysclk}}{F_{out}} = \frac{F_{sysclk}}{\left( \frac{I_{pd}}{[2 \times (V_{ref} - V_{rt})] \times C_{fb}} \right)} \quad (3)$$

In this equation, $F_{out}$ and $F_{sysclk}$ respectively represent the frequency of the output signal from the LTF converter 100 and the signal generator 28.

Figure 8:
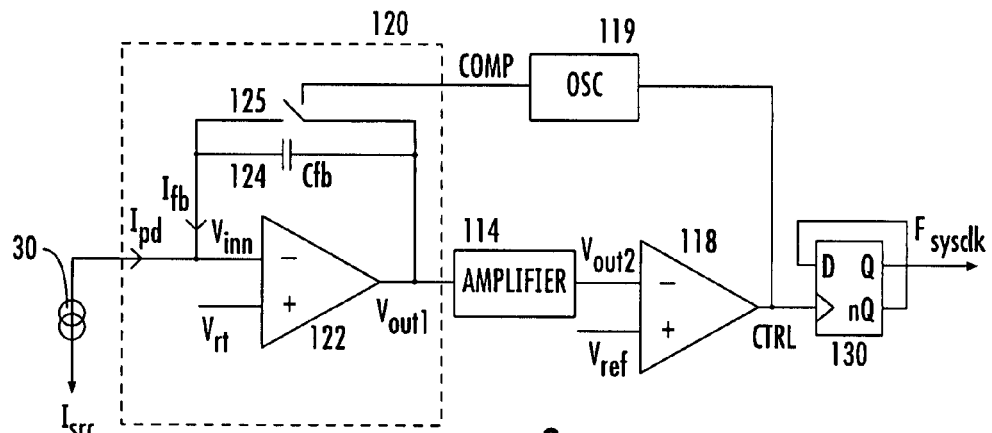
FIG. 8 is a block diagram of the clock component of the LTF converter light intensity calculator shown in FIG. 7.

A system clock circuit will now be discussed with reference to FIG. 8. The reference signal ($F_{sysclk}$) from the signal generator 28 is produced using the same charge sensing amplifier circuit 120 (comprising a comparator 122, a feedback capacitor 124 and a switch 125), amplifier 114, comparator 118, monostable multivibrator circuit 119 and capacitor resetting system 130 as that previously described for the LTF converter.

Figure 9:
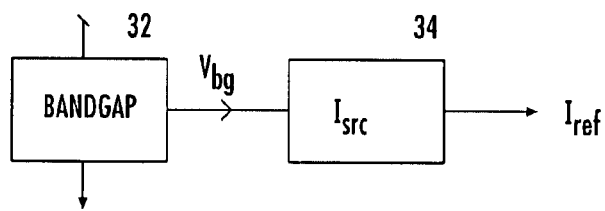
FIG. 9 is a block diagram of the circuit components of the constant current source of the clock component shown in FIG. 8.

However, in the case of the signal generator 28, the input current to the charge sensing amplifier circuit 120 is provided by a constant current source 30 (instead of the photodiode used in an LTF converter). The constant current source 30 is produced using a bandgap reference voltage 32 and voltage controlled current source 34 as shown in FIG. 9.

A count measurement and capacitance variability compensation will now be discussed. Returning to FIGS. 7 and 8, the current from the constant current source 30 thus fixes the frequency of the output signal ($F_{sysclk}$) from the signal generator 28 as shown in equation (4) below.

$$F_{sysclk} = \frac{I_{ref}}{[2 \times (V_{ref} - V_{rt}) \times C_{fb2}]} \quad (4)$$

Combining equations (3) and (4) results in the following equation for the COUNT variable from the counter 26.

$$COUNT = \frac{C_{fb}}{C_{fb2}} \times \frac{I_{pd}}{I_{ref}} \quad (5)$$

From the above equation it can be seen that the COUNT variable is effectively a function of the ratio of the capacitances of the feedback capacitors in the LTF converter 100 and the signal generator 28.

The feedback capacitors in the LTF converter 100 and the signal generator 28 are typically constructed in the metal layers of the chip embodying the two circuits. Accordingly, the capacitance of either of the two feedback capacitors ($C_{fb}$ or $C_{fb2}$) can be generically described by the following equation:

$$C = \frac{\epsilon_{ox} A}{t_{ox}} \quad (6)$$

where A represents the area of the capacitor and $\epsilon_{ox}$ and $t_{ox}$ respectively represent the dielectric constant and thickness of the silicon dioxide in the chip.

Processes such as chemical metal polishing (CMP) can cause variations to occur in the oxide thickness of capacitors, and thereby cause variations in their capacitances. To ensure that the conversion of charge to voltage in both the LTF converter and the clock are equivalent, the feedback capacitors of both systems ($C_{fb}$ and $C_{fb2}$) are matched.

Consequently, referring to equation (5) any part-to-part variations that occur between the two feedback capacitors will be cancelled out in the calculation of the ratio of the two capacitances in the Count measurement.

Figure 10:
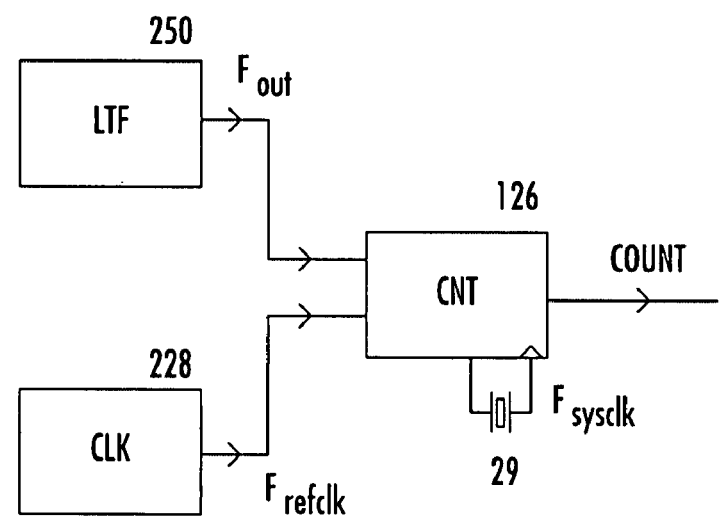
FIG. 10 is a block diagram showing an overview of a second embodiment of the LTF converter light intensity calculator component of the light monitor shown in FIG. 6.

A second embodiment of the LTF converter light intensity calculator will now be discussed with reference to FIG. 10. A low power second embodiment of the LTF converter light intensity calculator comprises an LTF converter 250, a reference signal generator 228 of the same structure as the reference signal generator employed in the first embodiment of the LTF converter light intensity calculator. However, in contrast with the first embodiment of the LTF converter light intensity calculator, in the second embodiment the reference signal is not used to clock the counter 126. Instead, the counter 126 is clocked by an external crystal oscillator 29.

In the second embodiment of the LTF converter light intensity calculator, the reference signal is periodically transmitted to the counter for calibration purposes. More particularly, since the frequency of the reference signal $F_{sysclk}$ is known, it is possible to predict the value of the COUNT variable that would be accumulated over a fixed time interval, when the reference signal is input to the counter. Any deviation from the expected value of the COUNT variable ($COUNT_{ref}$) can be ascribed to processing or other drift/variations in the LTF converter light intensity calculator. This deviation can be treated as a calibrating scaling factor and used to correct the COUNT variable measured from the LTF converter.

Since, the reference signal is not continually required to clock the counter in the second embodiment of the LTF converter light intensity calculator, the reference signal generator does not represent as significant a drain on the power of the light monitor.

Figure 11:
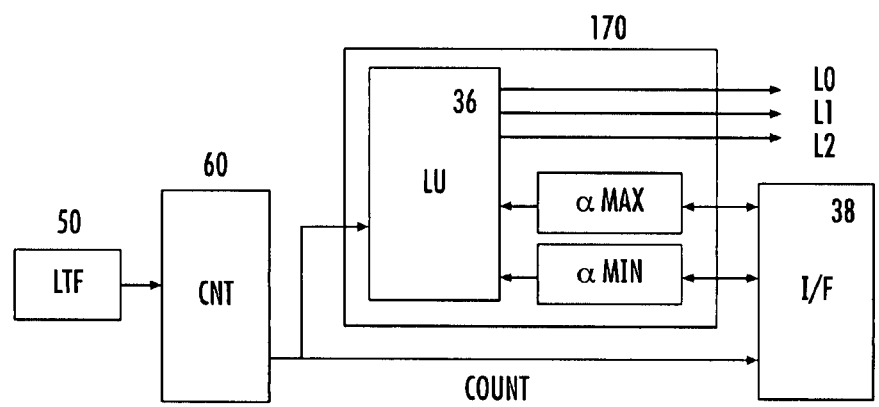
FIG. 11 is a block diagram of a first embodiment of a light intensity comparator component of the light monitor shown in FIG. 6, wherein the light intensity comparator is provided with a wired interface.

A light intensity threshold comparator 70 will now be discussed with reference to FIG. 11. The first embodiment of the light intensity threshold comparator 170 comprises a logic unit 36 in which the COUNT variable from the light intensity calculator 60 is compared against pre-defined upper and/or lower limits ($\alpha_{MAX}$ and $\alpha_{MIN}$). The light intensity threshold comparator 170 is provided with three logical output lines $L_0$, $L_1$ and $L_2$ corresponding to three following logical states:

$L_0$: COUNT<$\alpha_{MIN}$ $L_1$:$\alpha_{MIN}$<COUNT<$\alpha_{MAX}$ $L_2$: COUNT>$\alpha_{MAX}$ Accordingly, the value of the digital signal transmitted on each of these lines provides an indication of the logical status of the COUNT variable compared with the predefined upper and lower limits on same. These logical signals can then be transmitted to a simple controller (e.g., bang-bang controller).

The upper and lower limits $\alpha_{MAX}$ and $\alpha_{MIN}$ can be set through an interface 38 such as I2C, SPI or CAN. The absolute value of the Count measurement can also be transmitted through the interface 38 to a controller for the implementation of more sophisticated control algorithms.

Figure 12:
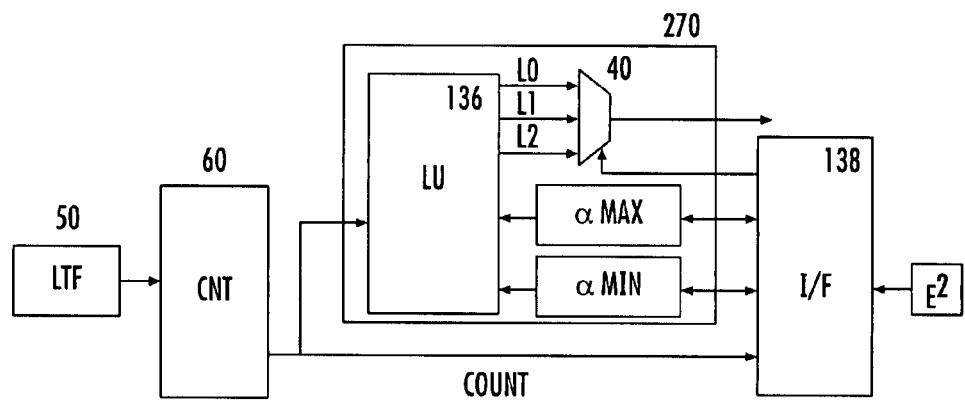
FIG. 12 is a block diagram of a second embodiment of a light intensity comparator component of the light monitor shown in FIG. 6, wherein the light intensity comparator is provided with a single pin output and a memory threshold load.

FIG. 12 shows a second embodiment of the light intensity threshold comparator 270 in which the three logical output lines from the light intensity threshold comparator 270 are transmitted from a single pin output. This is achieved using a multiplexor 40 that is controlled via the interface 138. In addition, the values of the upper and lower thresholds $\alpha_{MAX}$ and $\alpha_{MIN}$ can be automatically loaded from a memory (not shown) into the intensity threshold comparator 270 registers (not shown) via the interface 138.

Figure 13:
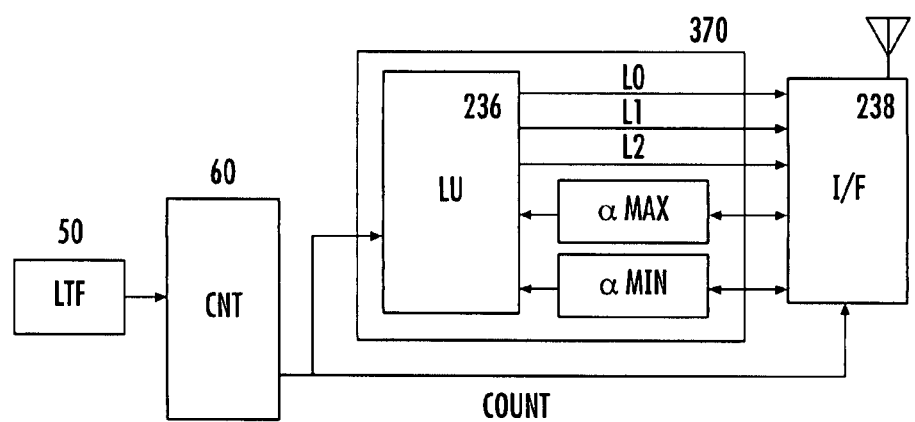
FIG. 13 is a block diagram of a third embodiment of a light intensity comparator component of the light monitor shown in FIG. 6, wherein the light intensity comparator is provided with a wireless interface.

FIG. 13 shows a third embodiment of the light intensity threshold comparator 370, in which the signals from the logical output lines L0, L1 and L2 (and the analog COUNT variable) are transmitted to a remote controller (not shown) through a wireless interface 238 rather than a specific output pin (as in the first and second embodiments of the light intensity threshold comparator). This could be achieved by a low power, low latency and inexpensive transmitter, such as a Zigbee transmitter. The light monitor can be readily included in an integrated circuit and is applicable to a broad range of devices including lighting control systems. An example lighting control system 125 is shown in FIG. 6. More particularly, the lighting control system 125 is applicable to portable computing device backlighting control systems, mobile telecommunications device back-lighting control systems, street lighting control systems and automotive lighting control systems (i.e., headlight controllers and dashboard illumination controllers). It will be appreciated that those skilled in the art may employ standard techniques to implement the invention in these and other ways. Alterations and modifications may be made to the above without departing from the scope of the invention.

That which is claimed is:

1. A light monitor comprising:
    a single semiconductor, substrate;
    a light to frequency (LTF) converter on said single semiconductor substrate for providing a pulsed signal representing an intensity of incident light;
    a light intensity calculator on said single semiconductor substrate and coupled to an output of said LTF converter, said light intensity calculator comprising
        a clock signal generator for providing a clock signal, and
        a counter for incrementing a measurement variable based upon the clock signal, the measurement variable being reset between each pulse received from said LTF converter; and
    said light intensity calculator scaling a signal generated by said LTF converter in accordance with the clock signal, and accumulating a resulting scaled signal in said counter for calculating a scaled measurement variable; and
    a threshold comparator on said single semiconductor substrate and coupled to an output of said light intensity calculator.

2. A light monitor according to claim 1, wherein said clock signal generator comprises:
    a current source; and
    a charge sensing amplifier circuit coupled to said current source and comprising a first feedback capacitor.

3. A light monitor according to claim 1, wherein said clock signal generator comprises a crystal oscillator; and wherein said light intensity calculator further comprises:
    a reference signal generator for generating a reference signal; and
    said counter accumulating the reference signal for calculating a reference variable.

4. A light monitor according to claim 3, wherein said counter comprises a gain adjustment calculator for calculating a gain adjustment that includes deviation between the reference variable and an expected value of the reference variable.

5. A light monitor according to claim 4, wherein said counter adjusts the measurement variable in accordance with the gain adjustment.

6. A light monitor according to claim 1, wherein said threshold comparator comprises at least one register for containing a value of a first limit variable, and compares a value of the measurement variable from said light intensity calculator with a value of the first limit variable.

7. A light monitor according to claim 6, wherein said threshold comparator outputs to an external system an indicator of whether the value of the measurement variable exceeds the value of the first limit variable.

8. A light monitor according to claim 7, wherein said threshold comparator comprises a single output pin for outputting the indicator to the external system.

9. A light monitor according to claim 1, wherein said threshold comparator comprises a plurality of registers for containing a value of a first limit variable and a second limit variable, said threshold comparator comparing a value of the measurement variable with a value of the first limit variable and the second limit variable.

10. A light monitor according to claim 9, wherein said threshold comparator outputs to an external system an indicator of whether the value of the measurement variable
    exceeds the value of the first limit variable;
    is less than the value of the second limit variable; or
    is between the values of the first limit variable and the second limit variable.

11. A light monitor according to claim 9, wherein said threshold comparator comprises outputs coupled to a bi-directional interface.

12. A light monitor according to claim 11, wherein the bi-directional interface comprises at least one of an I2C interface, an SPI interface and a CAN interface.

13. A light monitor according to claim 11, wherein the bi-directional interface comprises a wireless interface.

14. A light monitor according to claim 13, wherein the wireless interface comprises a Zigbee interface.

15. A light monitor according to claim 11, wherein said threshold comparator outputs the values of the first and second limit variables to said plurality of registers through said bi-directional interface.

16. An electronic device comprising:
    a light source for generating light;
    a light monitor for receiving incident light and comprising
        a single semiconductor substrate,
        a light to frequency (LTF) converter on said single semiconductor substrate for providing a pulsed signal representing an intensity of the incident light,
        a light intensity calculator on said single semiconductor substrate and coupled to an output of said LTV converter, said light intensity calculator comprising
            a clock signal generator for providing a clock signal, and
            a counter for incrementing a measurement variable based upon the clock signal, the measurement variable being reset between each pulse received from said LTF converter;
        a threshold comparator on said single semiconductor substrate and coupled to an output of said light intensity calculator and comprising at least one register for containing a value of a first limit variable, and for comparing a value of the measurement variable from said light intensity calculator with a value of the first limit variable; and
    a controller having an input for receiving the pulsed signal representing the intensity of the incident light from said light monitor, and providing a control signal to said light source in response thereto;
    said light source altering the generated light based upon the control signal.

17. An electronic device according to claim 16, wherein said clock signal generator comprises:
    a current source; and
    a charge sensing amplifier circuit coupled to said current source and comprising a first feedback capacitor.

18. An electronic device according to claim 16, wherein said light intensity calculator scales a signal generated by said LTF converter in accordance with the clock signal, and accumulates a resulting scaled signal in said counter for calculating a scaled measurement variable.

19. An electronic device according to claim 16, wherein said clock signal generator comprises a crystal oscillator; and wherein said light intensity calculator further comprises:
   a reference signal generator for generating a reference signal; and
   a crystal oscillator whose output provides a clock signal to said counter;
   said counter accumulating the reference signal for calculating a reference variable.

20. An electronic device according to claim 16, wherein said threshold comparator comprises a plurality of registers for containing the value of the first limit variable and a value of a second limit variable, and for comparing the value of the measurement variable with the values of the first and limit variables.

21. An electronic device according to claim 16, wherein said light source, said light monitor and said controller define a lighting control system for at least one of a portable computing device back-light control system, a mobile telecommunications device back-light control system, a street lighting control system, and an automotive lighting control system.

22. A method for making a light monitor comprising;
   forming on a single semiconductor substrate a light to frequency (LTF) converter for providing a pulsed signal representing an intensity of incident light, a light intensity calculator coupled to an output of the LTF converter, and a threshold comparator coupled to an output of the light intensity calculator, the light intensity calculator comprising
      a clock signal generator for providing a clock signal, the clock signal generator comprising a current source, and a charge sensing amplifier circuit coupled to the current source and comprising a first feedback capacitor, and
      a counter for incrementing a measurement variable based upon the clock signal, the measurement variable being reset between each pulse received from the LTF converter.

23. A method according to claim 22, wherein the light intensity calculator scales a signal generated by the LTF converter in accordance with the clock signal, and accumulates a resulting scaled signal in the counter for calculating a scaled measurement variable.

24. A method according to claim 22, wherein forming the light intensity calculator further comprises forming a reference signal generator for generating a reference signal, and wherein the counter accumulates the reference signal for calculating a reference variable.

25. A method according to claim 22, wherein forming the threshold comparator comprises forming at least one register for containing a value of a first limit variable, the threshold comparator for comparing a value of the measurement variable from the light intensity calculator with a value of the first limit variable.

26. A method according to claim 22, wherein forming the threshold comparator comprises forming a plurality of registers for containing a value of a first limit variable and a second limit variable, the threshold comparator for comparing a value of the measurement variable with a value of the first limit variable and the second limit variable.

* * * * *

UNITED STATES PATENT AND TRADEMARK OFFICE
CERTIFICATE OF CORRECTION

PATENT NO.       : 7,265,332 B2
APPLICATION NO.  : 11/154222
DATED            : September 4, 2007
INVENTOR(S)      : Baxter et al.

It is certified that error appears in the above-identified patent and that said Letters Patent is hereby corrected as shown below:

Column 3, Line 15    Delete: "$V_{rt}$) In"
                     Insert: -- $V_{rt}$). In --

Column 3, Line 18    Delete: "($I_{pd}$)"
                     Insert: -- ($I_{pd}$). --

Column 9, Line 18    Delete: "semiconductor, substrate"
                     Insert: -- semiconductor substrate --

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,265,332 B2 |
| APPLICATION NO. | : 11/154222 |
| DATED | : September 4, 2007 |
| INVENTOR(S) | : Baxter et al. |

Page 1 of 1

It is certified that error appears in the above-identified patent and that said Letters Patent is hereby corrected as shown below:

Column 10, Line 40          Delete: "LTV"
                                                     Insert: -- LTF --

Signed and Sealed this

Second Day of June, 2009

JOHN DOLL
*Acting Director of the United States Patent and Trademark Office*